(12) United States Patent
Hamada et al.

(10) Patent No.: US 11,243,302 B2
(45) Date of Patent: Feb. 8, 2022

(54) MANAGEMENT SYSTEM FOR OBJECTS UNDER MONITORING AND METHOD OF IDENTIFYING BEACON TERMINALS

(71) Applicant: CHIYODA CORPORATION, Yokohama (JP)

(72) Inventors: Yuki Hamada, Yokohama (JP); Masaki Kadono, Yokohama (JP); Yoshiaki Katsumata, Tokyo (JP); Shunichi Otagaki, Tokyo (JP); Yasuhisa Yamamoto, Tokyo (JP)

(73) Assignee: CHIYODA CORPORATION, Yokohama (JP)

( * ) Notice: Subject to any disclaimer, the term of this patent is extended or adjusted under 35 U.S.C. 154(b) by 507 days.

(21) Appl. No.: 16/301,988

(22) PCT Filed: May 15, 2017

(86) PCT No.: PCT/JP2017/018193
§ 371 (c)(1),
(2) Date: Nov. 15, 2018

(87) PCT Pub. No.: WO2017/199907
PCT Pub. Date: Nov. 23, 2017

(65) Prior Publication Data
US 2019/0285737 A1    Sep. 19, 2019

(30) Foreign Application Priority Data

May 18, 2016   (JP) .............................. JP2016-099775
Sep. 29, 2016   (JP) .............................. JP2016-190764

(51) Int. Cl.
*G01S 11/02*    (2010.01)
*H04W 4/029*    (2018.01)
(Continued)

(52) U.S. Cl.
CPC .............. *G01S 11/026* (2013.01); *G01S 1/042* (2013.01); *G01S 5/02* (2013.01); *G01S 5/14* (2013.01);
(Continued)

(58) Field of Classification Search
CPC .......... G01S 11/026; G01S 1/042; G01S 5/02; G01S 5/14; G01S 11/06; G01S 5/0009;
(Continued)

(56) References Cited

U.S. PATENT DOCUMENTS 4,743,908 A * 5/1988 Brassfield ............. G01S 13/583
                                                342/113
7,764,231 B1 * 7/2010 Karr ......................... G01S 5/02
                                                342/457

(Continued)

FOREIGN PATENT DOCUMENTS

JP    07-098371         4/1995
JP    07098371 A  *    4/1995  ............... G01S 5/14
(Continued)

OTHER PUBLICATIONS

Japanese Office Action dated Jan. 29, 2019, 5 pages.
International Search Report, dated Aug. 1, 2017 (Aug. 1, 2017), 2 pages.

*Primary Examiner* — Peter M Bythrow
*Assistant Examiner* — Nuzhat Pervin
(74) *Attorney, Agent, or Firm* — Rankin, Hill & Clark LLP

(57) ABSTRACT

A management system for objects under monitoring that is capable of managing the presence of moving objects under monitoring. The management system includes a plurality of beacon terminals, one or more management terminals, and a management server. The beacon terminals are respectively held by the moving objects under monitoring, and each have a unique identifier and broadcast a beacon signal. The one or (Continued)

more management terminals are respectively held by one or more moving bodies moving in one or more areas, receive beacon signals to acquire beacon identifiers and beacon presence information, and acquire location information via a positioning system. The management terminals output beacon information spontaneously or upon request. The management server determines the state of presence of the objects under monitoring in the one or more areas, based on the beacon information acquired from the one or more management terminals.

16 Claims, 14 Drawing Sheets

(51) Int. Cl.
| | | |
|---|---|---|
| *G01S 1/04* | (2006.01) | |
| *G01S 5/14* | (2006.01) | |
| *G01S 11/06* | (2006.01) | |
| *G06Q 10/06* | (2012.01) | |
| *H04B 1/59* | (2006.01) | |
| *G01S 5/02* | (2010.01) | |
| *G06Q 50/08* | (2012.01) | |

(52) U.S. Cl.
CPC ............. *G01S 11/06* (2013.01); *G06Q 10/06* (2013.01); *G06Q 50/08* (2013.01); *H04B 1/59* (2013.01); *H04W 4/029* (2018.02)

(58) Field of Classification Search
CPC .... G01S 5/0018; G01S 5/0231; G01S 5/0242; G01S 5/0249; G01S 5/0289; G01S 13/75; G01S 13/751; G01S 13/767; H04W 4/029; G06Q 10/06; G06Q 50/08; H04B 1/59
USPC .......................................................... 342/118
See application file for complete search history.

(56) References Cited

U.S. PATENT DOCUMENTS

| | | | | |
|---|---|---|---|---|
| 9,226,166 | B2* | 12/2015 | Kurz .................... | H04W 24/00 |
| 9,449,202 | B2* | 9/2016 | Clare ................... | H04W 16/28 |
| 10,018,713 | B2* | 7/2018 | Binzer ................. | G01S 13/878 |
| 10,455,538 | B2* | 10/2019 | Dong ................... | H04B 17/318 |
| 10,505,883 | B1* | 12/2019 | Jain ........................ | H04L 51/12 |
| 2004/0032363 | A1* | 2/2004 | Schantz .................... | G01S 5/14 |
| | | | | 342/127 |
| 2011/0309931 | A1* | 12/2011 | Rose ...................... | G06Q 10/08 |
| | | | | 340/539.13 |
| 2013/0021174 | A1* | 1/2013 | Silzer, Sr. ............ | G05D 1/0297 |
| | | | | 340/989 |
| 2013/0030931 | A1* | 1/2013 | Moshfeghi .............. | H04W 4/80 |
| | | | | 705/16 |
| 2013/0103419 | A1* | 4/2013 | Beaudry .................. | G08B 1/08 |
| | | | | 705/3 |
| 2014/0067257 | A1* | 3/2014 | Dave ................... | G01C 21/3453 |
| | | | | 701/423 |
| 2015/0242769 | A1* | 8/2015 | Kezeu .............. | G06Q 10/06314 |
| | | | | 705/7.11 |
| 2017/0061337 | A1* | 3/2017 | Kezeu .................... | G08G 1/164 |
| 2017/0097227 | A1* | 4/2017 | Sanders .................. | G01S 17/88 |
| 2017/0371322 | A1* | 12/2017 | Lake .......................... | G01S 5/00 |

FOREIGN PATENT DOCUMENTS

| | | | | | |
|---|---|---|---|---|---|
| JP | 2000134666 | A | * | 4/1995 | ............... G01S 5/02 |
| JP | 11-166971 | | | 6/1999 | |
| JP | 11166971 | A | * | 6/1999 | |
| JP | 2000-134666 | | | 5/2000 | |
| JP | 11166971 | A | * | 5/2000 | ................ H04J 3/00 |
| JP | 2000134666 | A | * | 5/2000 | |
| JP | 2013050325 | A | * | 3/2003 | ............. G01C 21/00 |
| JP | 2005-277500 | | | 10/2005 | |
| JP | 2007-004619 | | | 1/2007 | |
| JP | 2007004619 | A | * | 1/2007 | |
| JP | 2007-201921 | | | 8/2007 | |
| JP | 2007201921 | A | * | 8/2007 | |
| JP | 2007-271347 | | | 10/2007 | |
| JP | 2007258811 | A | * | 10/2007 | |
| JP | 2007271347 | A | * | 10/2007 | |
| JP | 2007-316028 | | | 12/2007 | |
| JP | 2007316028 | A | * | 12/2007 | |
| JP | 2010-040038 | | | 2/2010 | |
| JP | 2010-083674 | | | 4/2010 | |
| JP | 2010083674 | A | * | 4/2010 | |
| JP | 2011-048493 | | | 3/2011 | |
| JP | 2011-214920 | | | 10/2011 | |
| JP | 2011-215001 | | | 10/2011 | |
| JP | 2012010143 | A | * | 1/2012 | |
| JP | 2012-118747 | | | 6/2012 | |
| JP | 2012118747 | A | * | 6/2012 | |
| JP | 2013-050325 | | | 3/2013 | |
| JP | 2013050325 | A | * | 3/2013 | |
| JP | 2015126269 | A | * | 7/2015 | |
| JP | 2015225468 | A | * | 12/2015 | |

* cited by examiner

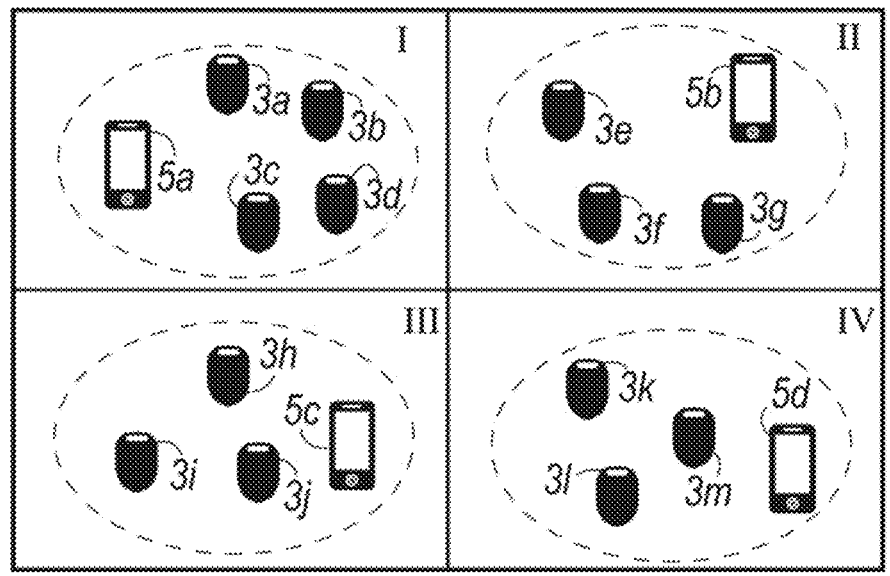
*Fig.3A*
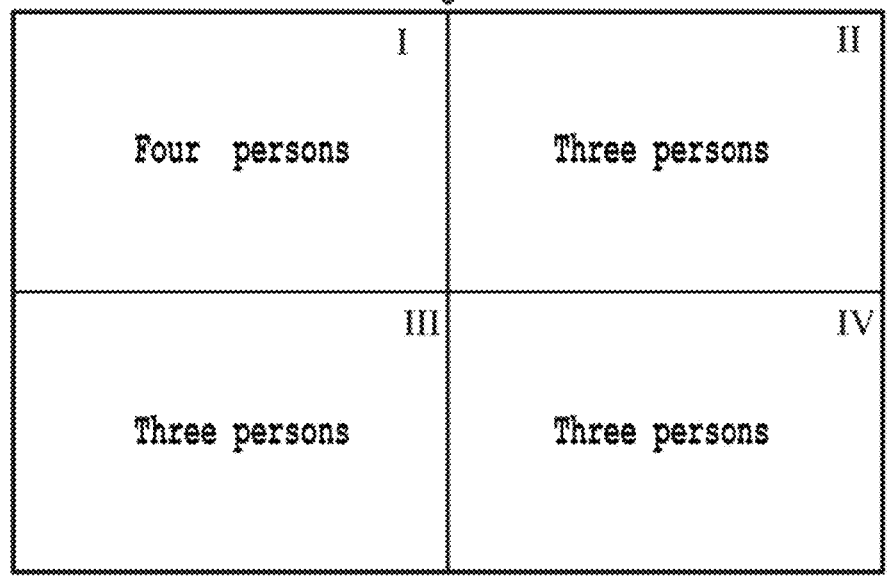
*Fig.3B*

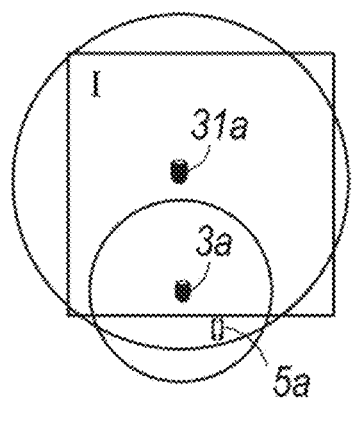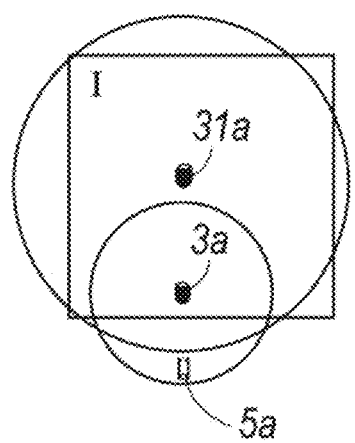

*Fig.11*

| Case 1 | Broadcasting | Pause | | Broadcasting |
|---|---|---|---|---|
| Case 2 | Broadcasting | Pause 1 | Broadcasting | Pause 2 |
| Case 3 | Pause 1 | Broadcasting | Broadcasting | Pause 2 |
| Case 4 | Broadcasting | Broadcasting | Pause | |
| Case 5 | Pause | | Broadcasting | Broadcasting |

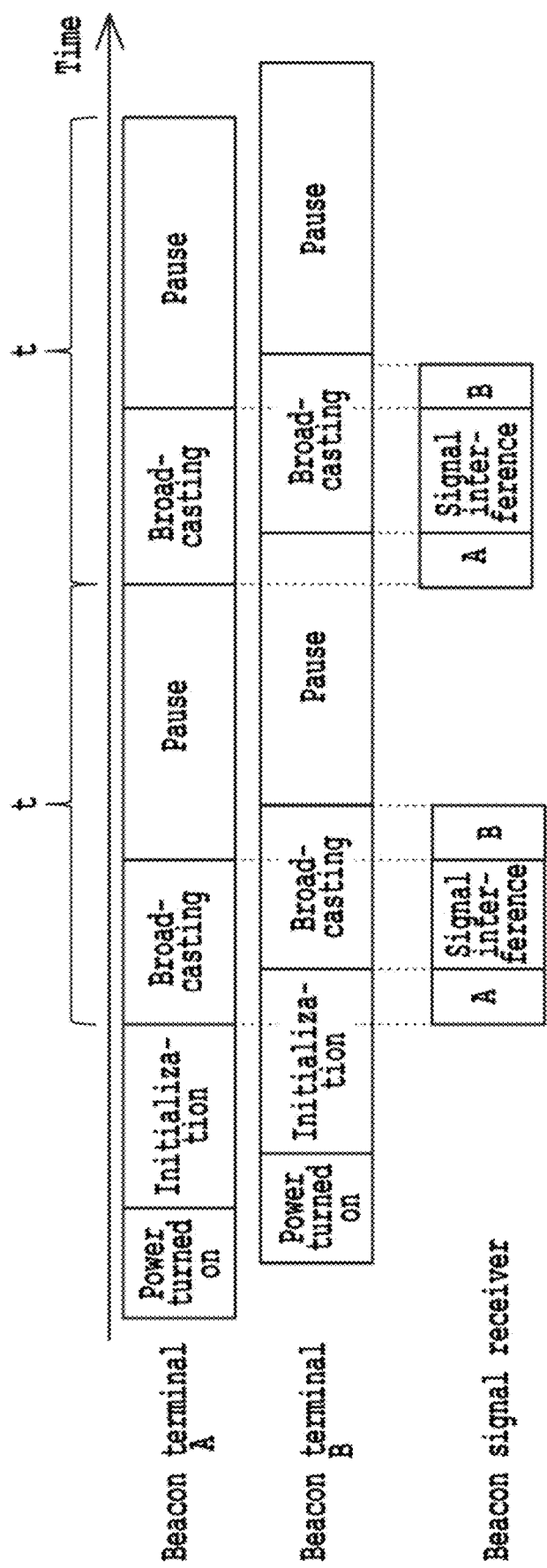

MANAGEMENT SYSTEM FOR OBJECTS UNDER MONITORING AND METHOD OF IDENTIFYING BEACON TERMINALS

TECHNICAL FIELD

The present invention relates to a management system for objects under monitoring that is intended to manage the state of presence of objects under monitoring such as field laborers moving in one or more work areas, and to a method of identifying beacon terminals.

BACKGROUND ART

There has been a need of managing the state of presence of a plurality of moving objects under monitoring. For example, in a plant construction site, labor management is required for checking whether the predetermined number of field laborers are working in predetermined work areas. Generally, field laborers' entry into and exit from the construction site is checked at the gate or the like, based on the RFID (Radio Frequency IDentifiction) information. As disclosed in JP 2010-040038 A (Patent Document 1), for example, a labor management system has been developed. In this system, RFID tags, which work as transmitters capable of broadcasting beacon signals, are held by field laborers, and RFID tag readers, which work as receivers capable of receiving the beacon signals, are installed in the construction site.

PRIOR ART DOCUMENTS

Patent Documents

Patent Document 1: JP 2010-040038 A
Patent Document 2: JP 2005-277500 A

SUMMARY OF INVENTION

Technical Problems

Generally, in the plant construction site, facilities or constructed buildings or structures do not exist at the beginning. The construction process proceeds step by step. In utilizing the beacon signals, it is necessary to install receivers at appropriate locations within work areas of the construction site. In an area where electrical wirings are not provided, construction for electrical wirings is required or it is necessary to install receivers each having a build-in storage battery as a power source. Electrical wiring construction incurs much cost. The storage batteries need troublesome regular charging and checking to see if the required power remains.

As the construction proceeds, facilities, buildings, structures, or the like are being constructed. In other words, obstacles to cause radio wave interference increase. Further, another problem is raised. At the locations where the receivers have been installed at the beginning of the construction, the receivers do not properly receive the radio waves emitted from transmitters. The installation locations of the receivers must be changed as the construction proceeds. In some cases, the construction proceeds in a high temperature and high humidity and dusty environment where mechanical facilities such as preinstalled receivers are likely to break down.

Accordingly, an object of the present invention is to provide a management system for objects under monitoring that is capable of managing the presence of a plurality of objects moving in one or more areas by simple means without the need of installing one or more receivers in advance.

Another object of the present invention is to provide a management system for objects under monitoring that is capable of locating a signal transmitter by utilizing the information on radio wave intensity of a signal received by a receiver.

A further object of the present invention is to provide a method of identifying beacon terminals, which is capable of averaging the power consumptions of a plurality of beacon terminals while preventing interference among beacon signals broadcast by a plurality of beacon terminals.

Solution to Problems

The management system for objects under monitoring of the present invention comprises a plurality of beacon terminals, one or more management terminals, and a management server. The beacon terminals are respectively held by a plurality of objects under monitoring that are located and moving in one or more areas. Each of the beacon terminals has a unique beacon identifier and is operable to broadcast a beacon signal. The one or more management terminals are respectively held by one or more moving bodies moving in the one or more areas and operable to receive the beacon signals to acquire the beacon identifiers and beacon presence information and also to acquire location information via a positioning system, and spontaneously or upon request to output the beacon identifiers, the beacon presence information, and the location information. The management server is operable to determine a state of presence of the objects under monitoring in the one or more areas, based on the beacon identifiers, the beacon presence information, and the location information as acquired from the one or more management terminals.

In the present invention, one or more management terminals (receivers), which are respectively held by the one or more moving bodies moving in the one or more areas, are used to receive beacon signals broadcast by the beacon terminals (transmitters). Thus, according to the present invention, it is possible to appropriately manage the state of presence of the objects under monitoring that are holding the beacon terminals. Namely, it is possible to grasp in which areas the objects under monitoring are located, without the need of installing receivers in the areas in advance. Further, even in an area where many metallic structures are present and radio wave interference may likely occur, the moving bodies (receivers) move within the area, thereby enabling the beacon signals to be readily received.

For example, assume that the one or more areas are one or more work areas, and the objects under monitoring are a plurality of field laborers working in the one or more work areas, and the one or more moving bodies are one or more site foremen who supervise the field laborers. By having each of the field laborers hold a beacon terminal and having each of the one or more site foremen, who attend the field laborers, hold a management terminal, it is possible to identify in which area an approximate number of field laborers are located at least in respect of the field laborers who are present in the neighborhood of the site foremen (within a region where the beacon signals broadcast by the beacon terminals are reachable).

As can clearly be known from the foregoing, in the present invention, it is not always required to grasp the exact number of field laborers located in the one or more areas and the exact locations thereof. It is sufficient to identify the number of field laborers located in the one or more areas with certain accuracy.

Any type of beacon terminals may be used as far as they are capable of broadcasting a beacon signal. As a transmitter (a beacon terminal), for example, an iBeacon (registered trademark) device based on Bluetooth (registered trademark) Low Energy (BLE) technology may be used, but the transmitters are not limited to this. Likewise, any type of management terminals may be used as far as they are compatible with signals received from the beacon terminals. As a management terminal, for example, a smart phone capable of receiving radio wave generated by an iBeacon device may be used, but the receivers are not limited to this.

The moving objects under monitoring are not only humans but also other animals. The one or more moving bodies are not limited to humans. Of course, automated running vehicles and drones may be the moving bodies.

The beacon presence information may include various information. The beacon presence information may include radio wave intensities of beacon signals and the management server may be configured to determine the number of the objects under monitoring located in the one or more areas as the state of presence of the objects under monitoring, based on the beacon identifiers, the radio wave intensity information, and the location information. With the radio wave intensity information, it is possible to estimate a separation distance between the management terminal and the beacon terminal which has broadcast the beacon signal, thereby identifying more accurately the location of the object under monitoring (in which area the object is located).

With two or more management terminals, it is possible to increase the accuracy with which to determine the location (area) of a beacon terminal. For example, when two of the one or more management terminals receive one beacon signal from one of the beacon terminals, the management server may be configured to determine respective separation distances between the beacon terminal that has broadcast the beacon signal and the two management terminals, based on the radio wave intensity information; and to depict two circles respectively centering on the two management terminals using the respective separation distances as a radius; and to determine that the beacon terminal, which has broadcast the one beacon signal, is located in the area where a larger part of an overlapping area of the two circles is located. With a single management terminal, it is possible only to estimate a separation distance between the management terminal and the beacon terminal. With two management terminals, however, it is possible to grasp an approximate location of the beacon terminal in an area.

When three of the one or more management terminals receive one beacon signal from one of the beacon terminals, the management server may be configured to determine respective separation distances between the beacon terminal that has broadcast the beacon signal and the three management terminals, based on the radio wave intensity information; and to depict three circles respectively centering on the three management terminals using the respective separation distances as a radius; and to determine that the beacon terminal, which has broadcast the one beacon signal, is located in the area where a point of intersection of the three circles is located. This is so-called triangulation. The location of the beacon terminal is determined by triangulation method, and locating accuracy is furthermore increased, compared with the use of two management terminals. Further, when four or more of the one or more management terminals receive one beacon signal from one of the beacon terminals, the management server may be configured to determine the location of the beacon terminal that has broadcast the one beacon signal, based on the radio wave intensity information received from three of the four or more management terminals that have higher radio wave intensities than the other management terminals. Note that in some occasions, the management server receives two or more beacon signals having a radio wave intensity of the same level. In this case, reception date and time information, which indicates a date and time that the one or more management terminals have received the beacon signal, may be included in the beacon presence information; and the management server may be configured to select a more recent beacon signal from the two or more beacon signals.

In addition to the one or more management terminals, the management system for objects under monitoring may further comprise one or more fixed management terminals respectively arranged fixedly in the one or more areas, and operable to receive the beacon signals to acquire the beacon identifiers and the beacon presence information and also to acquire the location information via the positioning system, and spontaneously or upon request to output the beacon identifiers, the beacon presence information, and the location information. In this case, the management server may be configured to determine a state of presence of the objects under monitoring in the one or more areas, based on the beacon identifiers, the beacon presence information, and the location information as acquired from both of the one or more management terminals and the one or more fixed management terminals. If not only the one or more management terminals but also the one or more fixed management terminals are provided, the state of presence of the moving objects under monitoring can be confirmed more readily even in an area where reception of the radio wave is not easy or the moving bodies do not enter frequently.

In a plant construction site, for example, metallic buildings and/or structures increase as the construction proceeds. Therefore, it is reasonably expected that the reachable distance of a beacon signal will become shorter due to reflection and/or interference of the radio wave in some work areas. It is also expected that there will be intricate or complicated places or some areas which the site foremen do not frequently enter. In such cases, if the one or more fixed management terminals may be arranged in the one or more areas where reachable distances of the beacon signals to be broadcast by the beacon terminals become shorter due to the presence of signal-reflecting structures or matters or the site foremen (the one or more moving bodies) do not enter frequently, the beacon signals can more readily be received and the state of presence of the field laborers (objects under monitoring) can accurately be checked.

The management system for objects under monitoring may further comprise one or more fixed beacon terminals respectively arranged fixedly in the one or more areas. Here, each of the fixed beacon terminals has a unique beacon identifier and is operable to broadcast a reference beacon signal; and the management server may be configured to store location information relating to arrangement of the one or more fixed beacon terminals. Specifically, when the one or more management terminals receive not only one or more of the beacon signals but also the reference beacon signal, the management server determines that one or more of the beacon terminals, which have broadcast the beacon signals, are located in the same area as the fixed beacon terminal that has broadcast the reference beacon signal. With this arrangement, even in an area where radio wave from a satellite cannot be received and accordingly the management terminals cannot acquire the location information, the state of presence of the objects under monitoring in one or more areas can be determined. Further, one or more fixed beacon terminals and one or more fixed management terminals may jointly be employed.

Beacon terminals are capable of broadcasting beacon signals, assuming that one or more unspecified terminals (management terminals) capable of receiving beacon signals as receivable radio wave are present in the neighborhood of the beacon terminals. For example, iBeacon (registered trademark) terminals based on Bluetooth (registered trademark) Low Energy (BLE) technology are assumed.

A plurality of beacon terminals each emit radio waves in a broadcasting manner, and one or more beacon signal receivers (management terminals) receive them to manage the state of presence of the beacon terminals such as their locations, based on the received beacon signals. For this purpose, it is necessary to set the frequencies and radio wave intensities of the beacon signals at substantially the same level. Such setting, however, may cause interference of the beacon signals having substantially the same level of radio wave intensity at the time that the beacon signals are received by the beacon signal receivers (management terminals). Thus, there is a possibility that the beacon signals cannot be received.

FIG. 14 illustrates an example of beacon signal interference that may occur. The beacon terminals each have a unique beacon signal broadcasting cycle of a predetermined length (t) that is a combination of a time duration during which a beacon signal is broadcast and a pause period during which a beacon signal is not broadcast. Generally, each beacon terminal repeats broadcasting and pause in a constant cycle. Here, there is a risk of collision of radio waves if the broadcasting time length of one beacon terminal (beacon terminal A) is duplicate with that of another beacon terminal (beacon terminal B) and a beacon signal receiver (management terminal) receives the beacon signals broadcast by the beacon terminal A and the beacon signal broadcast by the beacon terminal B at substantially the same level of reception intensity. In such case, the beacon signal receiver (management terminal) may not be able to receive the signals broadcast by either of the beacon terminals A and B.

As described in JP 2005-277500 A (Patent Document 2), for example, an attempt was made to avoid collision of radio waves by varying the pause periods of the beacon signals.

The beacon terminals that are elements of the management system for objects under monitoring are small-sized devices that do not disturb the holders of the beacon terminals. Many of them employ a non-chargeable primary battery as a power source. They are disposable, that is, they are discarded when the battery power is exhausted. In the management system for objects under monitoring, it is assumed that tens or hundreds or more beacon terminals are used at the same time. Under such circumstances, there is a need of avoiding a situation where the beacon terminals exhaust their battery powers at different times. For this purpose, the beacon terminals should preferably be started and ended in use at substantially the same time, and be replaced with new ones within an expected battery life cycle.

As disclosed in JP 2005-277500 A (Patent Document 2), however, if the pause periods of the beacon terminals are varied, it is likely that the number of broadcasting times for each beacon terminal may be varied within a certain period. As a result, the power consumptions of the respective beacon terminals may be varied, thereby causing the remaining powers of the respective beacon terminals to be varied.

A plurality of beacon terminals are prepared. Here, the beacon terminals store a plurality of predetermined signal patterns and are operable to generate a signal array in a constant cycle according to one signal pattern selected from the predetermined signal patterns. The signal array includes two or more beacon signals each having a constant time length and two or more signal pause periods. At the beacon terminals in each cycle or in every some cycles, one signal pattern is randomly selected from the predetermined signal patterns for use in a subsequent cycle or some subsequent cycles. Then, another signal array is generated according to the signal pattern, which has been newly selected, in the subsequent cycle or some subsequent cycles.

With use of such beacon terminals, it is possible to set, within a certain period, the number of broadcasting times of the respective beacon terminals to the same value while preventing the interference of the beacon signals by shifting the broadcasting timing of each beacon signal in one cycle or every some cycles. As a result, the power consumptions of the beacon terminals can be averaged. Provided that the use of the beacon terminals is started at the same time and the same use period is set for the beacon terminals, the remaining battery powers of the beacon terminals will theoretically be the same, thereby facilitating management of the remaining battery powers of the beacon terminals.

It is arbitrary how to randomly select a signal pattern from a plurality of signal patterns. Generally, since the beacon terminals each have a unique individual number comprised of one or more numbers, one or more letters, and/or one or more symbols. The signal pattern can be selected by a simple method such as utilizing one or more numbers, letters, or symbols, or any combination thereof.

The beacon terminals may be configured to randomly vary the ratio of the two or more signal pause periods when a signal pattern is selected, in which the beacon signal and the pause period alternately appear. By varying the ratio of the pause periods, prevention of interference of beacon signals can furthermore be facilitated. In this case, the ratio may be varied by utilizing one or more numbers, letters, or symbols that form a unique individual number of a beacon terminal, or any combination thereof.

BRIEF DESCRIPTION OF DRAWINGS

FIGS. 3A and 3B are conceptual diagrams of the management system for objects under monitoring according to the embodiment.

FIGS. 8A and 8B respectively illustrate that the location of a beacon terminal is identified using fixed beacon terminals.

FIG. 11 illustrates an example signal pattern for the beacon terminal.

FIG. 14 illustrates an example time chart when implementing a method of identifying beacon terminals according to the prior art.

DESCRIPTION OF EMBODIMENTS

Now, a management system for objects under monitoring and a method of identifying beacon terminals according to embodiments of the present invention will be described in detail below with reference to the accompanying drawings.

Figure 1:
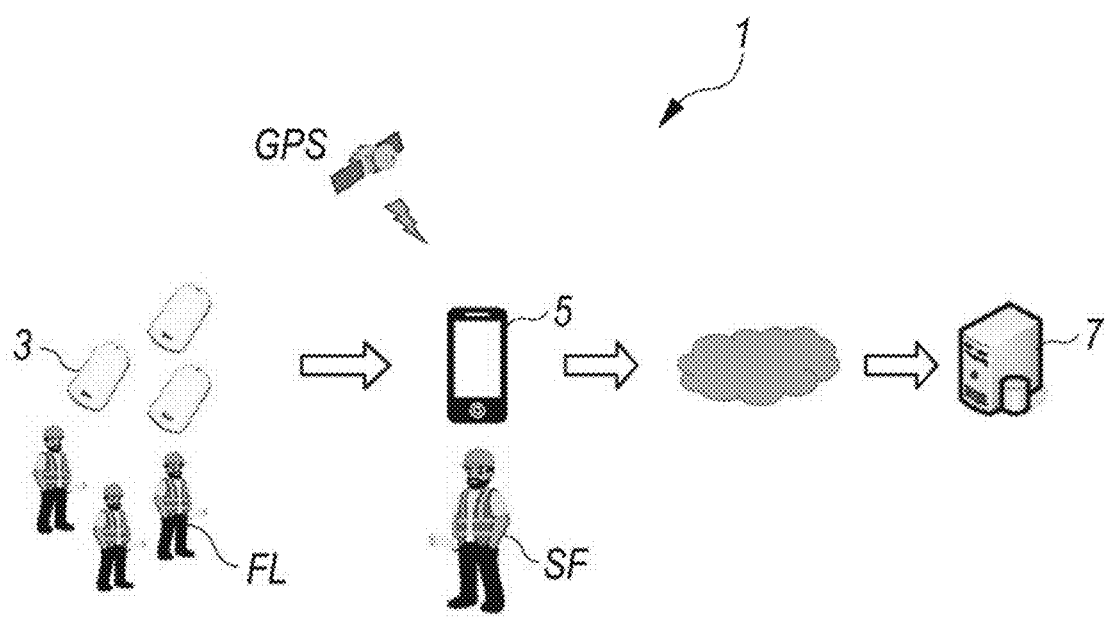
FIG. 1 is a conceptual diagram illustrating a management system for objects under monitoring when applied to labor management in a plant construction site, according to an embodiment of the present invention.
Figure 2:
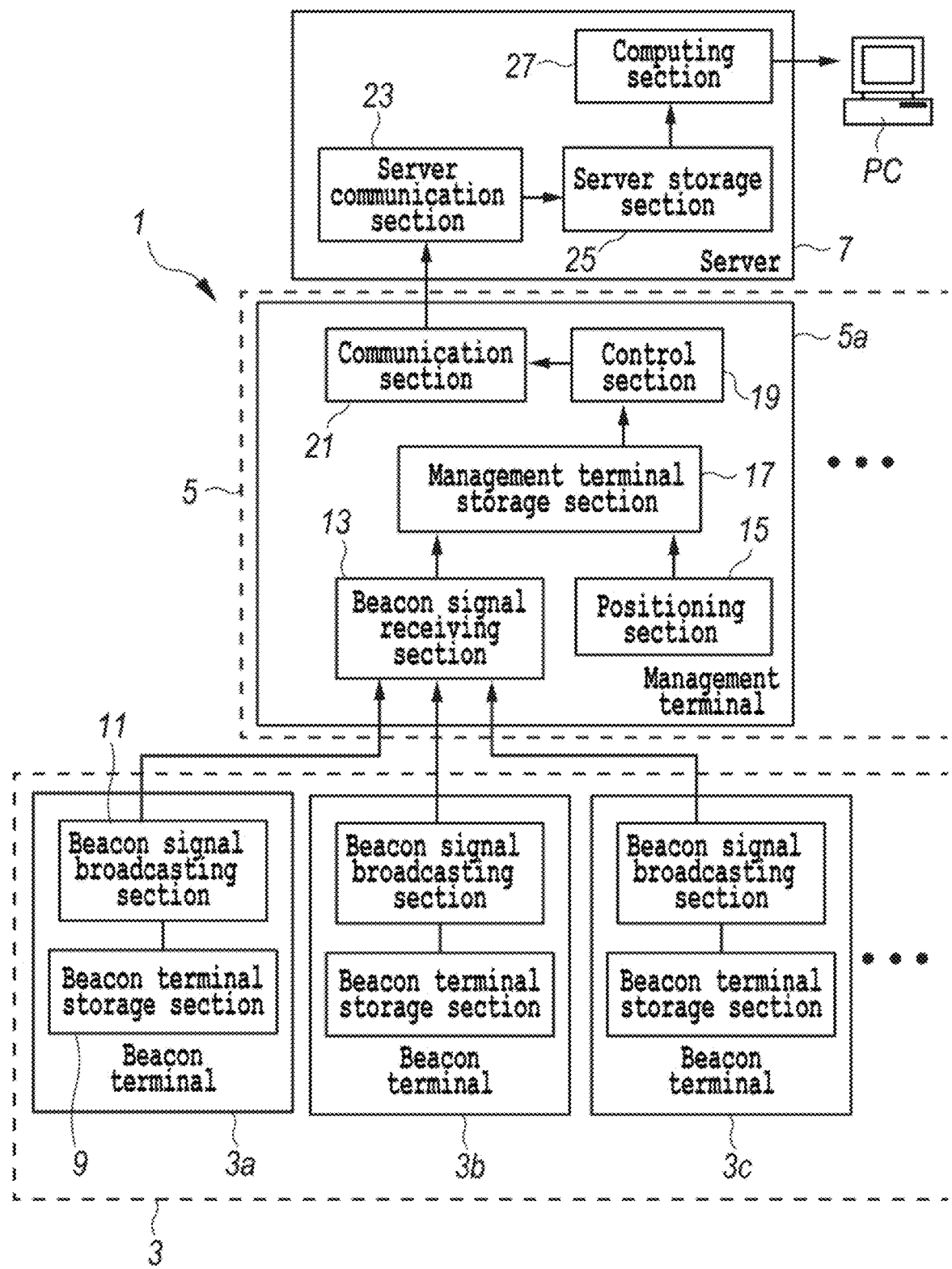
FIG. 2 is a block diagram of the management system for objects under monitoring according to the embodiment.

FIG. 1 is a conceptual diagram illustrating a management system for objects under monitoring when applied to labor management in a plant construction site, according to an embodiment of the present invention. FIG. 2 is a block diagram of the management system for objects under monitoring according to the embodiment. FIG. 3A illustrates a plurality of beacon terminals and one or more management terminals which are located in one or more areas. For convenience of explanation, holders of the respective beacon terminals are omitted from the illustration. FIG. 3B illustrates an example output from a computing section in an example of FIG. 3A.

In a plant construction site, a plurality of field laborers (field workers) FL and site foremen (supervisors) SF are divided into groups. The field laborers and site foremen move from an area to another area to work in units of groups. The management system for objects under monitoring of the present embodiment is intended to approximately grasp how many field laborers and in which areas the field laborers FL, who are located in the neighborhood of one or more site foremen SF moving within the plant construction site, are located.

As illustrated in FIG. 1, the management system 1 for objects under monitoring of the embodiment includes a plurality of beacon terminals 3, one or more management terminals 5, and a management server 7. The beacon terminals 3 (beacon terminal 3a, 3b, 3c, . . . ) are respectively held by the field laborers FL (objects under monitoring) who are located and move within the plant construction site. The beacon terminals 3 each have a unique beacon identifier and are operable to broadcast a beacon signal. In the embodiment, the beacon terminal 3 is an iBeacon (registered trademark) device, which is a transmitter based on Bluetooth (registered trademark) Low Energy (BLE) technology. Since the transmitter is light in weight and compact in size, it can be carried by a field laborer. For example, it is attached to a neck strap that the field laborer wears around his/her neck. The beacon terminal 3 includes a beacon terminal storage section 9 configured to store a beacon identifier and a beacon signal broadcasting section 11 operable to broadcast a beacon signal.

One or more management terminals 5 (management terminal 5a, 5b, 5c, . . . ) are held by one or more site foremen SF (moving bodies) moving within the plant construction site. The one or more management terminals are operable to receive the beacon signals to acquire the beacon identifiers and beacon presence information and also to acquire location information via a positioning system (GPS), and spontaneously or upon request to output the beacon identifiers, the beacon presence information, and the location information. The beacon presence information includes radio wave intensity information of the received beacon signal, and reception date and time information which indicates a date and time that the one or more management terminals have received the beacon signal. In the embodiment, the management terminals 5 are smart phones capable of receiving the radio wave emitted from an iBeacon device. The management terminals 5 each include a beacon signal receiving section 13 operable to receive beacon signals broadcast by the beacon terminals 3 to acquire beacon identifiers and beacon presence information, a positioning section 15 operable to identify the location of the management terminal 5 by means of the positioning system (GPS), and a management terminal storage section 17 configured to store the beacon identifiers, beacon presence information, and location information (hereinafter, sometime generically referred to as "beacon information"). Further, The management terminals 5 each include a control section 19 operable to read out the beacon identifiers, the beacon presence information and the location information from the management terminal storage section 17 and a communication section 21 through which the above-mentioned information is output. The communication section 21 is connected to the Internet network.

The management server 7 is operable to determine the state of presence of the objects under monitoring in the plant construction site, based on the beacon identifiers, the beacon presence information, and the location information as acquired from the management terminals 5. The management server 7 includes a server storage section 25 configured to store the beacon identifiers, the presence information, and the location information as acquired from the management terminals 5 and a server communication section 23 through which the management server 7 acquires the above-mentioned information. The management server 7 further includes a computing section 27 operable to read out the beacon identifiers, the presence information, and the location information regularly (for example, every one hour) that are stored in the server storage section 25, to compute the state of presence of the beacon terminals 3, and to store the state of presence of the field laborers FL in the server storage section 25. Then, upon request by an external terminal PC, the computing section 27 outputs the computation result. Of course, the computing section 27 may be configured to read out the beacon identifiers, the presence information, and the location information that are stored in the server storage section 25, to compute the state of presence of the beacon terminals 3, and to output the computation result as the state of presence of the field laborers FL to the external terminal PC, as requested by the external terminal PC.

In the embodiment, the construction site is divided into four areas, I, II, III, and IV. The latitudes and longitudes of the four areas are obtained in advance by utilizing the positioning system (GPS). In an example illustrated in FIG. 3A, the field laborers and site foremen are divided into four groups. Each group includes a plurality of field laborers and one site foreman, and work respectively in the four areas, I, II, III, and IV. When a request to check the state of presence of the field laborers is issued by the external terminal PC at the timing illustrated in FIG. 3A, the result is obtained as illustrated in FIG. 3B. The output result is not limited to this example, but may be in a form in which the locations of the field laborers are dotted on a map.

<Location Estimation Based on the Beacon Information Acquired from One Management Terminal>

Figure 4:
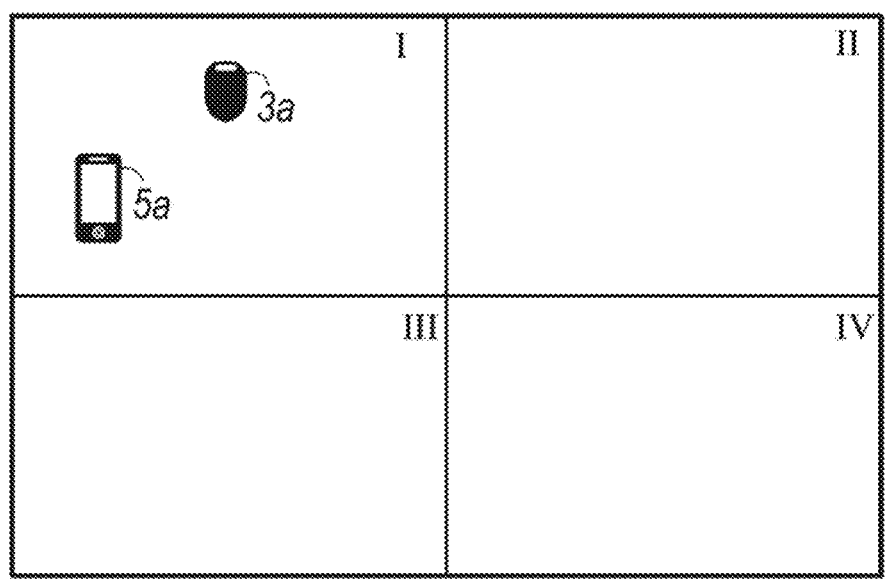
FIG. 4 is a conceptual diagram illustrating that the location of a beacon terminal is computed based on the beacon information acquired from one management terminal.

FIG. 4 is a conceptual diagram illustrating that the location of the beacon terminal 3a is computed based on the beacon information acquired from one management terminal 5a when the computing section 27 computes the state of presence of the field laborers FL.

In an example illustrated in FIG. 4, only the management terminal 5a receives the beacon signals broadcast by the beacon terminal 3a, and the state of presence of the field laborers is determined based on the beacon information acquired from the management terminal 5a.

In this example, the computing section 27 determines that the beacon terminal 3a is located in the same area as the management terminal 5a. As illustrated in FIG. 4, it is determined that the field laborer FL carrying the beacon terminal 3a is located in Area I.

When estimating the location of the beacon terminal 3 based on the beacon information acquired from one management terminal, accuracy of location identification can be increased by lowering the output of a beacon signal of the beacon terminal 3 to allow a management terminal 5 located in the neighborhood of the beacon terminal to detect it.

<Location Estimation Based on the Beacon Information from Two Management Terminals>

Figure 5:
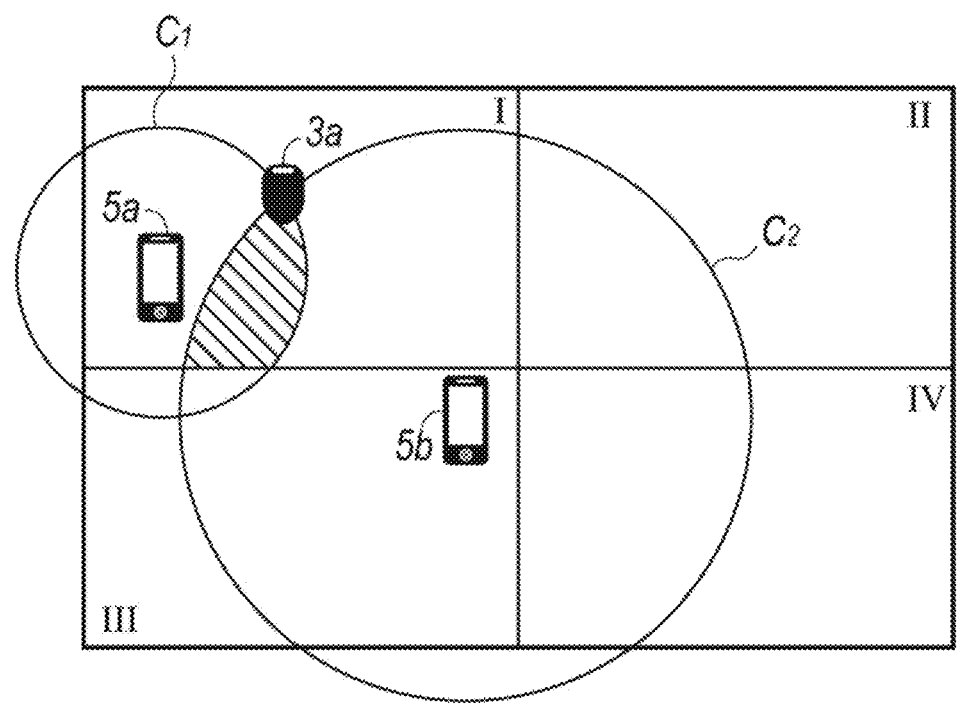
FIG. 5 is a conceptual diagram illustrating that the location of a beacon terminal is computed based on the beacon information acquired from two management terminals.

FIG. 5 is a conceptual diagram illustrating that the location of the beacon terminal 3a is computed based on the beacon information acquired from two management terminals 5a, 5b when the computing section 27 computes the state of presence of the field laborers FL.

In an example illustrated in FIG. 5, two management terminals 5a, 5b receive the beacon signals broadcast by the beacon terminal 3a, and the state of presence of the field laborers is determined based on the beacon information acquired from the two management terminals 5a, 5b.

The shorter the separation distance between the management terminal 5 and the beacon terminal 3 is, the stronger the radio wave intensity is. Conversely, the longer the separation distance between the management terminal 5 and the beacon terminal 3 is, the weaker the radio wave intensity is. Thus, there is a proportional relationship between the separation distance and the radio wave intensity. In the embodiment, a conversion table for the relationship between the radio wave intensity and the separation distance between the management terminals 5 and the beacon terminal 3 is prepared in advance. The computing section 27 determines the separation distances between the beacon terminal 3a and the two management terminals 5a, 5b, based on the radio wave intensity information included in the beacon information. Then, the computing section 27 depicts two circles C1, C2 respectively centering on the management terminals 5a, 5b with the respective separation distances as a radius, and determines that the beacon terminal 3a is located in the area where a larger part of an overlapping area of the two circles C1, C2 is located. In the example of FIG. 5, a larger part of the overlapping area of two circles C1, C2 is located in Area I, not Area III. It is determined that the field laborer FL carrying the beacon terminal 3a is located in Area I.

<Location Estimation Based on the Beacon Information from Three Management Terminals>

Figure 6:
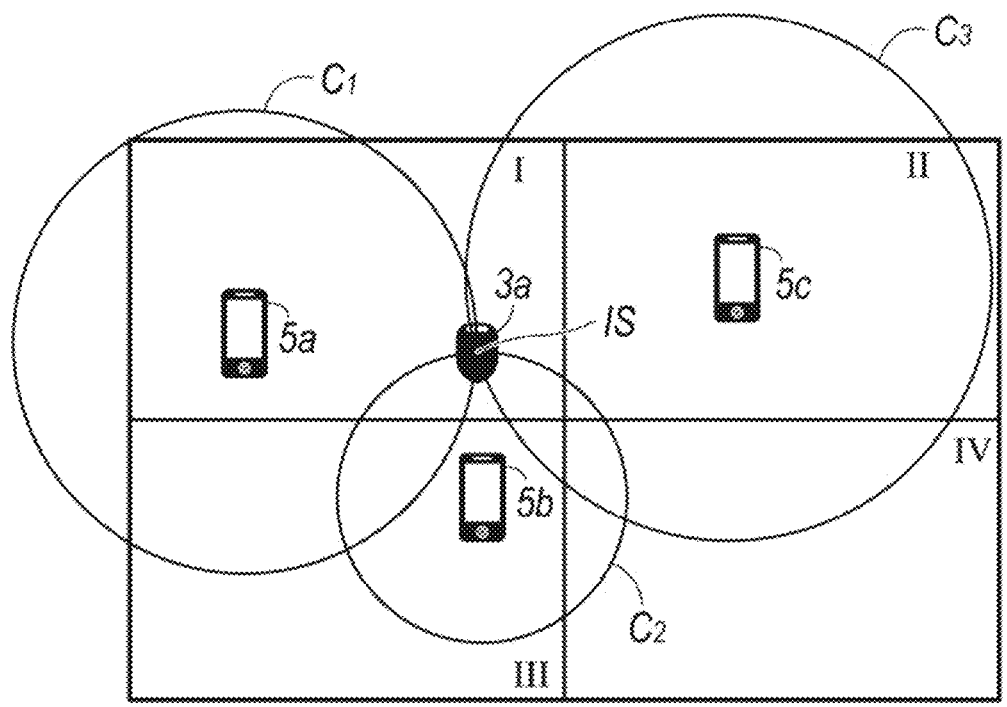
FIG. 6 is a conceptual diagram illustrating that the location of a beacon terminal is computed based on the beacon information acquired from three management terminals.

FIG. 6 is a conceptual diagram illustrating that the location of a beacon terminal is computed based on the beacon information acquired from three management terminals 5a, 5b, 5c when the computing section 27 computes the state of presence of the field laborers FL.

In an example illustrated in FIG. 6, three management terminals 5a, 5b, 5c receive the beacon signals broadcast by the beacon terminal 3a, and the state of presence of the field laborers is determined based on the beacon information acquired from the three management terminals 5a, 5b, 5c. Further, four or more management terminals 5 receive the beacon signals broadcast by the beacon terminal 3a, and the state of presence of the field laborers is determined based on the beacon information acquired from the three management terminals 5 (5a, 5b, 5c) having stronger radio wave intensity than the others. If two or more received beacon signals have radio wave intensities of the same level, a more recent beacon signal, namely, a beacon signal received later (having a more recent reception date and time), is selected.

The computing section 27 uses the above-mentioned conversion table to determine the separation distances between the beacon terminal 3a and three management terminals 5a, 5b, 5c, based on the radio wave intensity information included in the beacon information. Then, the computing section 27 depicts three circles C1, C2, C3 respectively centering on the management terminals 5a, 5b, 5c with the respective separation distances as a radius, and determines that the beacon terminal 3a is located in an area where a point IS of intersection of the three circles C1, C2, C3 is located. In the example of FIG. 6, since the point IS of intersection is located in Area I, it is determined that the field laborer FL carrying the beacon terminal 3a is located in Area I.

<Fixed Management Terminal>

Figure 7:
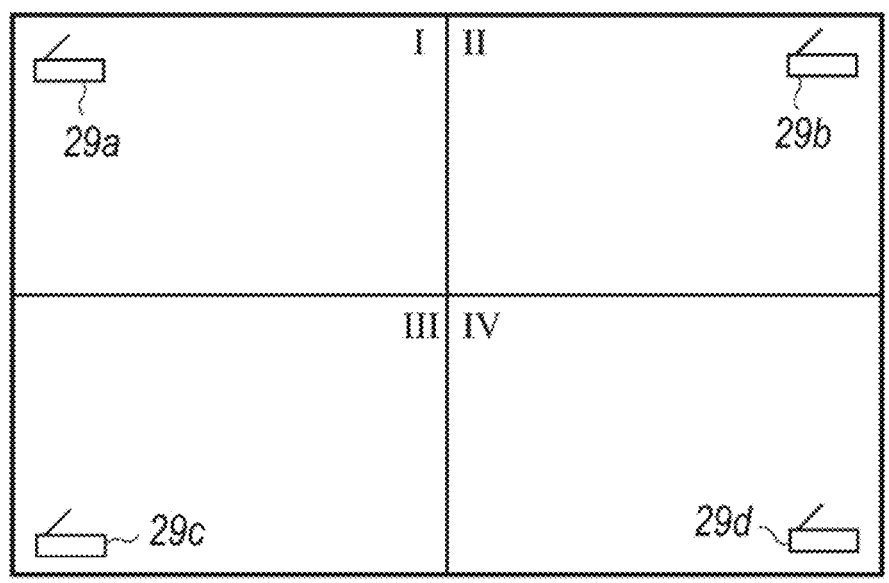
FIG. 7 illustrates that one or more fixed management terminals are arranged in one or more areas.

In the examples mentioned so far, one or more management terminals 5 are configured to receive the beacon signals. In addition to one or more management terminals 5, the management system 1 for objects under monitoring may further include one or more fixed management terminals 29 (29a, 29b, 29c, . . . ) that are respectively arranged fixedly in the one or more areas, and are operable to receive the beacon signals to acquire the beacon identifiers and the beacon presence information and also to acquire the location information via the positioning system, and spontaneously or upon request to output the beacon identifiers, the beacon presence information, and the location information. FIG. 7 illustrates that one or more fixed management terminals 29 are arranged in the plant construction site. The one or more fixed management terminals 29 are preferably arranged in those areas where reachable distances of the beacon signals to be broadcast by the beacon terminals become shorter, or intricate or complicated areas where the site foremen do not frequently enter. In the work areas within the plant construction site, as the construction proceeds, metallic structures or facilities are increasing and the field laborers working in the intricate or complicated areas are also increasing. It is possible to accurately determine the state of presence of the field laborers (objects under monitoring) by installing one or more fixed management terminals 29 in such areas in advance. The fixed management terminals 29 may be of fixed-installation type, but may be smart phones. For example, when using the smart phones, the site foremen place the phones in predetermined locations before the work is started, and collect the phones after the work is ended.

<Fixed Beacon Terminals>

The management system 1 for objects under monitoring may further include one or more fixed beacon terminals 31 (31a, 31b, 31c, . . . ) that are respectively arranged fixedly in one or more areas, and each of the fixed beacon terminals 31 has a unique beacon identifier and is operable to broadcast a reference beacon signal. In this case, the management server 7 stores location information relating to arrangement of the one or more fixed beacon terminals 31. When the one or more management terminals 5 receive not only one or more of the beacon signals but also the reference beacon signal, the management server determines that one or more beacon terminals 3, which have broadcast the beacon signals, are located in the same area as the fixed beacon terminal 31 that has broadcast the reference beacon signal. With this arrangement, even in an area where radio wave from a satellite cannot be received and accordingly the management terminals 5 cannot acquire the location information, the state of presence of the objects under monitoring in one or more areas can be determined. In an example illustrated in FIG. 8A, the management terminal 5a receives not only a beacon signal from the beacon terminal 3a but also a reference beacon signal from the fixed beacon terminal 31a. Then, the management server 7 determines that the field laborer FL carrying the beacon terminal 3a is located in Area I. In an example illustrated in FIG. 8B, since the management terminal 5a does not receive a reference beacon signal, the management server 7 determines the location of the field laborer FL by a different method described above. The circles depicted in FIGS. 8A and 8B indicate the reachable distances of the radio wave emitted from the beacon terminal 3a and the fixed beacon terminal 31a.

Figure 9A:
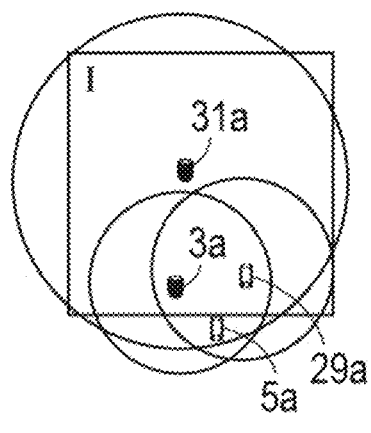
FIGS. 9A to 9C respectively illustrate that the location of a beacon terminal is identified using a fixed management terminal and a fixed beacon terminal.
Figure 9B:
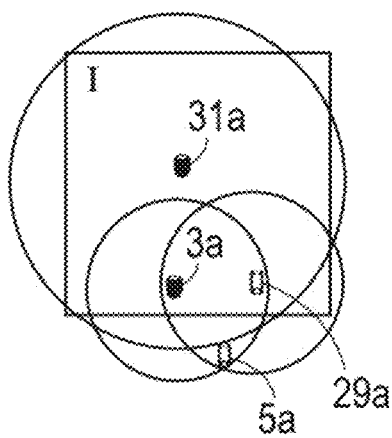
Figure 9C:
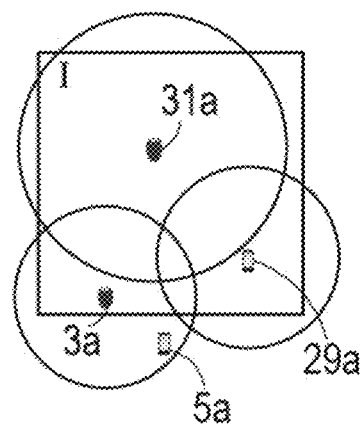

The fixed management terminals 29 and the fixed beacon terminals 31 can jointly be used. In an example illustrated in FIG. 9A, the management terminal 5a receives not only a beacon signal from the beacon terminal 3a but also a reference beacon signal from the fixed beacon terminal 31a. The fixed management terminal 29a also receives not only a beacon signal from the beacon terminal 3a but also a reference beacon signal from the fixed beacon terminal 31a. The management server 7 determines that the field laborer FL carrying the beacon terminal 3a is located in Area I, based on either of the information from the management terminal 5a and the fixed management terminal 29a. In an example illustrated in FIG. 9B, the management terminal 5a does not receive a reference beacon signal, but the fixed management terminal 29a receives not only a beacon signal from the beacon terminal 3a but also a reference beacon signal from the fixed beacon terminal 31a. Then, the management server 7 determines that the field laborer FL carrying the beacon terminal 3a is located in Area I. In an example illustrated in FIG. 9C, since neither of the management terminal 5a and the fixed management terminal 29a receives a reference beacon signal, the management server 7 should determine the location of the field laborer FL by a different method as mentioned above. The circles depicted in FIGS. 9A to 9C indicate the reachable distances of the radio waves emitted from the beacon terminal 3a, the fixed management terminal 5a, and the fixed beacon terminal 31a.

<Detailed Configuration of a Beacon Terminal>

Figure 10:
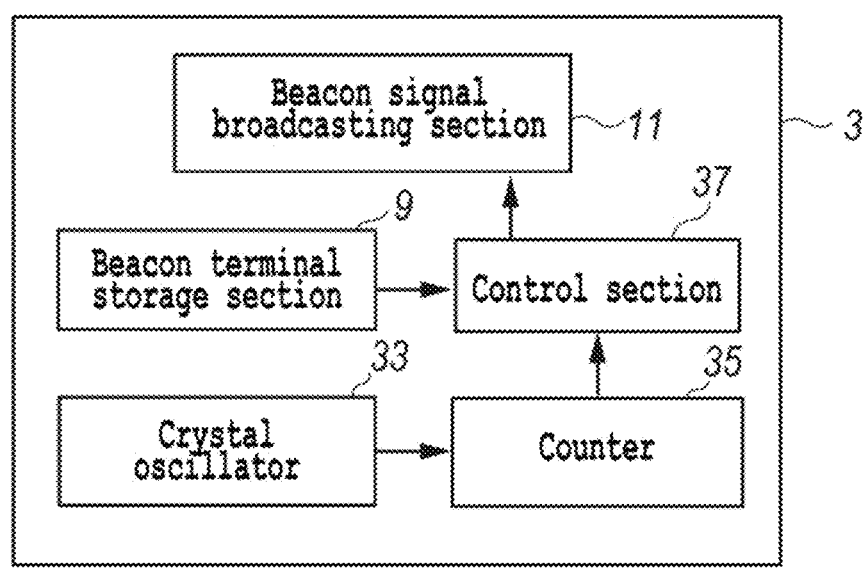
FIG. 10 is a block diagram of an example beacon terminal.

FIG. 10 is a block diagram illustrating the detailed configuration of the beacon terminal 3. Though the configuration of the beacon terminal 3 is briefly illustrated in FIG. 2, the beacon terminal 3 is illustrated in more details in FIG. 10. The beacon terminal 3 includes a beacon terminal storage section 9, a crystal oscillator 33, a counter 35, a control section 37, and a beacon signal broadcasting section 11. The beacon terminal storage section 9 stores a unique beacon identifier (UUID; Universally Unique IDentifier which is an individual number of the beacon terminal), and a plurality of predetermined signal patterns. The crystal oscillator 33 works as a base clock. The counter 35 constitutes the time reference, and is operable to count up the output from the crystal oscillator 33, starting from zero to obtain a counter value. The control section 37 is operable to perform computations, as described later, based on the individual number of the beacon terminal and the counter value to select a signal pattern. The beacon signal broadcasting section 11 broadcasts a beacon signal in accordance with a signal pattern determined by the control section 37.

<Signal Pattern>

The beacon terminal 3 has a beacon broadcasting cycle of a predetermined time length (t). The beacon broadcasting cycle is a combination of a beacon signal broadcasting period during which a beacon signal is being broadcast and a signal pause period during which a beacon signal is not broadcast. In the embodiment, the beacon terminals each store a plurality of predetermined signal patterns and are operable to generate a signal array in a constant cycle according to one signal pattern selected from the predetermined signal patterns. The signal array includes two or more beacon signals each having a constant time length and two or more signal pause periods. Specifically, defining n continuous beacon broadcasting cycles (n is an integer of 2 or more) as one set, the maximum number of combinations of signal broadcasting and pause periods is represented by expression of 2n!/n!(2n−n)!. For example, if two beacon broadcasting cycles are defined as one set, the number of combinations is 6. If three beacon broadcasting cycles are defined as one set, the number of combinations is 20. m combinations are selected from the maximum number of combinations as predetermined signal patterns to be stored in the beacon terminals. Here, 2≤m≤2n!/n!(2n−n)! where m is an integer.

In the embodiment, as illustrated in FIG. 11, five signal patterns are selected as predetermined signal patterns (Case 1 to Case 5) from six combinations where two beacon signal broadcasting cycles (time length=2t) are defined as one set. In the signal pattern illustrated in FIG. 11, if the pause periods are continuous, the pause periods are not divided but are indicated simply as "Pause". If the pause periods are divided into two, they are indicated as "Pause 1" and "Pause 2".

<Selection of Signal Patterns>

Figure 12:
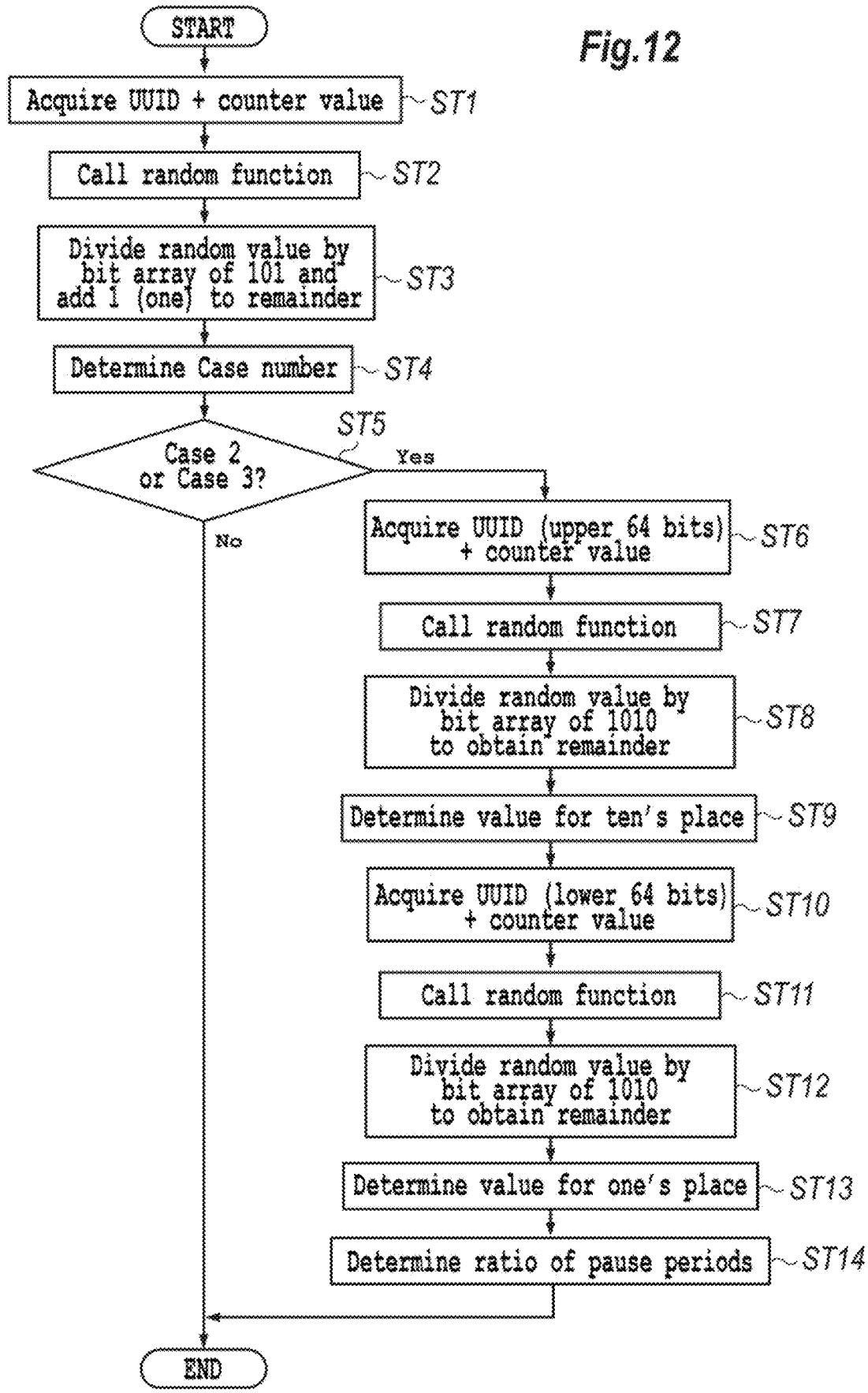
FIG. 12 is a flowchart illustrating the steps of determining a signal pattern for the beacon terminal.

FIG. 12 is a flowchart illustrating the steps of determining a signal pattern for the beacon terminal. In the embodiment, each beacon terminal 3 selects a signal pattern while it is initialized at the time of startup. After that, it performs computation during a pause period to select a subsequent signal pattern. First, the control section 37 acquires from the beacon terminal storage section 9 a 128-bit numeric value that constitutes the UUID; also acquires a counter value from the counter 35; and then adds the two values (Step ST1). Next, a random function is called using the resulting value as a seed to obtain a random number (Step ST2). Then, the obtained random number is divided by a bit-array of 101 (equivalent of a decimal number of 5); 1 (one) is added to the remainder to obtain a numeric value (Step ST3). Here, an obtained value is any one of 1, 2, 3, 4, and 5, corresponding to the signal patterns, Case 1 to Case 5. Thus, a signal pattern is selected (Step ST4).

In the embodiment, to avoid collision of the beacon signals, the ratio of Pause 1 and Pause 2 is varied for Case 2 and Case 3. The total duration of two pause periods is the same for any signal pattern. For Case 2 and Case 3 in which the pause period is divided into two pause periods, Pause 1 and Pause 2, collision of beacon signals are more positively avoided by varying the ratio of the pause periods. Once a signal pattern has been determined, it is judged whether Case 2 or Case 3 has been selected (Step ST5). If it is Case 2 or Case 3, the control section 37 acquires upper 64 bits of the 128-bit UUID from the beacon terminal storage section 9, and also acquires the counter value at the time of computation from the counter 35, and adds the two values (step ST6). Next, the random function is called using the resulting value as a seed to obtain a random number (Step ST7). Then, the obtained random number is divided by a bit array of 1010 (equivalent to a decimal number of 10) to obtain a numeric value (Step ST8). Here, the obtained numeric value is set to the ten' place of the value (ratio) for Pause 1 (Step ST9). Next, the control section 37 acquires from the beacon terminal storage section 9 a numeric value represented by lower 64 bits of the 128-bit numeric value that constitutes the UUID and also acquires the counter value from the counter 35, and adds the two values (Step ST10). Next, the random function is called using the obtained numeric vale as a seed to obtain a random number (Step ST11). Then, the obtained numeric value is divided by a bit array of 1010 (equivalent to a decimal number of 10) to obtain a numeric value (Step ST12). Here, the obtained numeric value is set to the one's place of the numeric value (ratio) for Pause 1 (Step ST13). Thus, the numeric value for Pause 1 is determined, and the numeric value for Pause 1 is subtracted from 100 to obtain a numeric value which is in turn set to the numeric value (ratio) for Pause 2. Thus, the ratio of Pause 1 and Pause 2 is determined (Step ST14). For example, if a numeric value obtained for Pause 1 is 62, a numeric value for Pause 2 is 38 and the ratio of Pause 1 and Pause 2 is 62:38.

Figure 13:
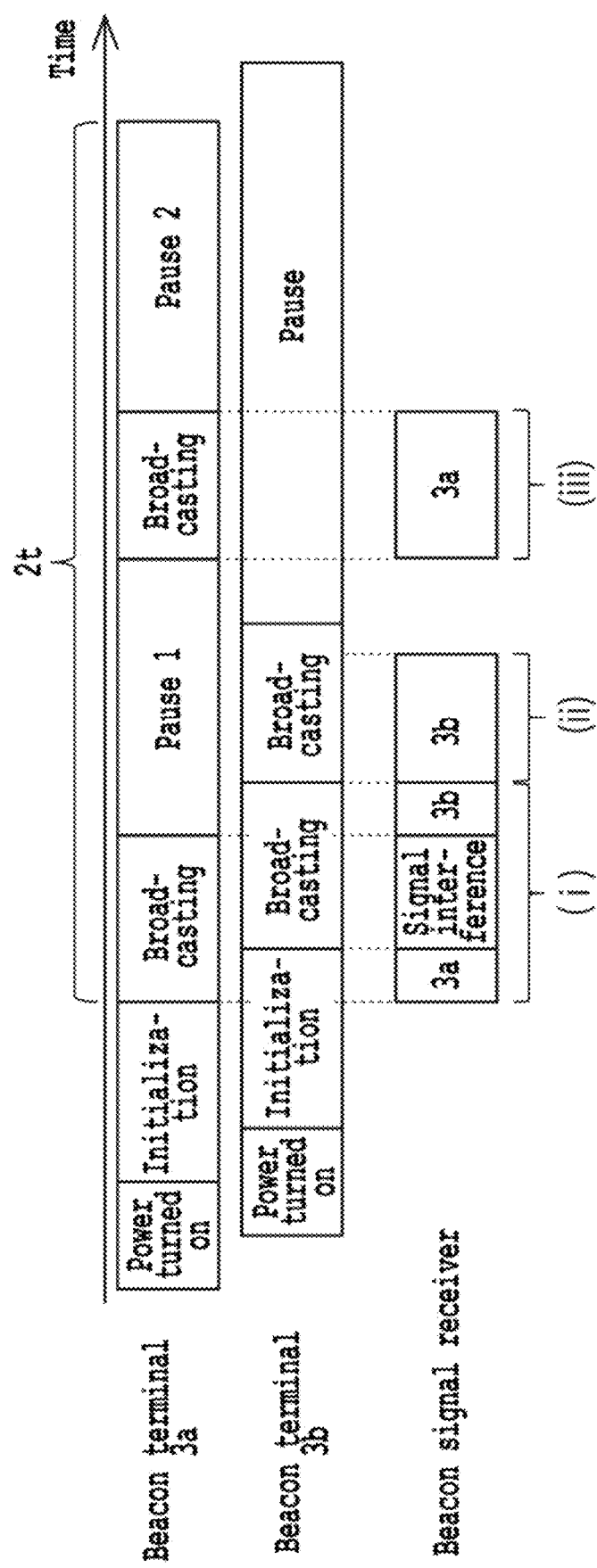
FIG. 13 illustrates an example time chart when implementing a method of identifying beacon terminals according to an embodiment of the present invention.

FIG. 13 illustrates an example time chart when implementing a method of identifying beacon terminals according to the embodiment of the present invention. In the beacon terminal 3a, Case 2 is selected as a signal pattern during initialization, and the ratio of Pause 1 and Pause 2 is 50:50. In the beacon terminal 3b, Case 4 is selected as a signal pattern during initialization. Assume the reception intensity of a beacon signal, which the terminal beacon signal receiver (management terminal) 5 receives from the beacon terminal 3a, is approximately the same as that of a beacon signal that the terminal beacon signal receiver (management terminal) 5 receives from the beacon terminal 3b. At (i) collision of signals occurs; at (ii) a beacon signal is received from the beacon terminal 3b; and at (iii) a beacon signal is received from the beacon terminal 3a. Thus, the beacon signal receiver (management terminal) 5 can receive beacon signals from both beacon terminals even though the radio wave intensities of the signals do not vary. Further, within a predetermined period (two cycles in FIG. 11), both of the beacon terminals 3a and 3b broadcast a beacon signal twice and the total length of the pause periods is the same for the two beacon terminals. Theoretically, therefore, the power consumption is the same for the two beacon terminals. The beacon terminal 3a computes a subsequent signal pattern during the pause period of Pause 2, and the beacon terminal 3b computes a subsequent signal pattern during the pause period of Pause.

In the embodiment, the time length t of the signal broadcasting period and the pause period is 1 s (one second). Depending on the amount of transmitted information, the broadcasting period of a beacon signal is about 100 ms. In FIG. 13, the ratio of the signal broadcasting period and the pause period is not exactly illustrated for convenience of explanation.

So far, the embodiments (examples) of the present invention have specifically been described, but the present invention is not limited to the examples shown herein. Modifications and variations can be made within the scope of the invention.

For example, the management system 1 for objects under monitoring is applied to labor management in the embodiment. In case of emergency, the management system 1 can be used to estimate the locations where the field laborers are left behind, judging from the locations of last communication with the field laborers, and go and rescue them.

The moving objects under monitoring are not limited to humans, but may be other animals or the like. One or more moving bodies are not limited to humans, but may be running vehicles, drones, or the like.

Further, the present invention can be applied as an event management system intended to grasp the number of event participants and the locations thereof by having a beacon terminal carried by each participant and enabling the management terminal of the event manager to receive beacon signals.

For example, the signal pattern is varied every one cycle as with the examples mentioned above, but it may be varied every some cycles. It is sufficient to randomly select a signal pattern. The computation described above does not always need to be done. Any other appropriate methods may be employed. In the embodiment described herein, UUID allocated to each beacon terminal is used for selection of signal patterns. Depending on the beacon terminals, other types of numbers, letters, and/or symbols can be used.

INDUSTRIAL APPLICABILITY

The present invention provides a management system for objects under monitoring that is capable of managing the presence of moving objects under monitoring by simple method without the need of installing receivers in advance. The present invention also provides a method of identifying beacon terminals that is capable of averaging the power consumptions of beacon terminals while preventing interference of beacon signals broadcast by a plurality of beacon terminals.

DESCRIPTION OF REFERENCE NUMERALS

1 Management system for objects under monitoring
3 Beacon terminal
5 Management terminal (Beacon signal receiver)
7 Management server
9 Beacon terminal storage section
11 Beacon signal broadcasting section
13 Beacon signal receiving section
15 Positioning section
17 Management terminal storage section
19 Control section
21 Communication section
23 Server communication section
25 Server storage section
27 Computing section
29 Fixed management terminal
31 Fixed beacon terminal
33 Crystal oscillator
35 Counter
37 Control section

The invention claimed is:

1. A management system for objects under monitoring comprising:
   a plurality of beacon terminals respectively held by a plurality of objects under monitoring that are located and moving in one or more areas, each of the beacon terminals having a unique beacon identifier and being operable to broadcast a beacon signal,
   one or more management terminals respectively held by one or more moving bodies moving in the one or more areas and operable to receive the beacon signals to acquire the beacon identifiers and beacon presence information and also to acquire location information via a positioning system, and spontaneously or upon request to output the beacon identifiers, the beacon presence information, and the location information, and a management server operable to determine a state of presence of the objects under monitoring in the one or more areas, based on the beacon identifiers, the beacon presence information, and the location information as acquired from the one or more management terminals, wherein the one or more moving bodies are one or more site foremen who supervise the plurality of objects under monitoring;

the beacon terminals store a plurality of predetermined signal patterns and are operable to generate a signal array in a constant cycle according to one signal pattern selected from the predetermined signal patterns, the signal array including two or more beacon signals each having a constant time length and two or more signal pause periods;

the beacon terminals randomly select, in each cycle or in every some cycles, one signal pattern from the predetermined signal patterns for use in a subsequent cycle or some subsequent cycles, and generate another signal array according to the signal pattern, which has been newly selected, in the subsequent cycle or some subsequent cycles; and the beacon terminals randomly vary a ratio of the two or more signal pause periods when the beacon terminals select the signal pattern in which the beacon signal and the signal pause period alternately appear.

2. The management system for objects under monitoring according to claim 1, wherein:

the beacon presence information includes radio wave intensity information of the beacon signal; and the management server determines the number of the objects under monitoring located in the one or more areas as the state of presence of the objects under monitoring, based on the beacon identifiers, the radio wave intensity information, and the location information.

3. The management system for objects under monitoring according to claim 2, wherein:

when two management terminals receive one beacon signal from one of the beacon terminals, the management server determines respective separation distances between the beacon terminal that has broadcast the beacon signal and the two management terminals, based on the radio wave intensity information, and depicts two circles respectively centering on the two management terminals using the respective separation distances as a radius, and determines that the beacon terminal, which has broadcast the one beacon signal, is located in the area where a larger part of an overlapping area of the two circles is located.

4. The management system for objects under monitoring according to claim 2, wherein:

when three management terminals receive one beacon signal from one of the beacon terminals, the management server determines respective separation distances between the beacon terminal that has broadcast the beacon signal and the three management terminals, based on the radio wave intensity information, and depicts three circles respectively centering on the three management terminals using the respective separation distances as a radius, and determines that the beacon terminal, which has broadcast the one beacon signal, is located in the area where a point of intersection of the three circles is located.

5. The management system for objects under monitoring according to claim 4, wherein:

when four or more management terminals receive one beacon signal from one of the beacon terminals, the management server determines a location of the beacon terminal that has broadcast the one beacon signal, based on the radio wave intensity information received from three of the four or more management terminals that have a higher radio wave intensity than the other management terminals.

6. The management system for objects under monitoring according to claim 5, wherein:

the beacon presence information includes reception date and time information which indicates a date and time that the one or more management terminals have received the beacon signal; and when the management server receives two or more beacon signals having a radio wave intensity of the same level, the management server selects a more recent beacon signal from the two or more beacon signals.

7. The management system for objects under monitoring according to claim 1, further comprising:

one or more fixed management terminals respectively arranged fixedly in the one or more areas, and operable to receive the beacon signals to acquire the beacon identifiers and the beacon presence information and also to acquire the location information via the positioning system, and spontaneously or upon request to output the beacon identifiers, the beacon presence information, and the location information, wherein:

the management server determines a state of presence of the objects under monitoring in the one or more areas, based on the beacon identifiers, the beacon presence information, and the location information as acquired from both of the one or more management terminals and the one or more fixed management terminals.

8. The management system for objects under monitoring according to claim 7, wherein:

the one or more fixed management terminals are arranged in the one or more areas where reachable distances of the beacon signals to be broadcast by the beacon terminals become shorter due to the presence of one or more signal-reflecting objects or the one or more moving bodies do not enter frequently.

9. The management system for objects under monitoring according to claim 1, further comprising:

one or more fixed beacon terminals respectively arranged fixedly in the one or more areas, each of the fixed beacon terminals having a unique beacon identifier and being operable to broadcast a reference beacon signal;

the management server stores location information relating to arrangement of the one or more fixed beacon terminals; and when the one or more management terminals receive not only one or more of the beacon signals but also the reference beacon signal, the management server determines that one or more of the beacon terminals, which have broadcast the beacon signals, are located in the same area as the fixed beacon terminal that has broadcast the reference beacon signal.

10. The management system for objects under monitoring according to claim 1, further comprising:

one or more fixed management terminals respectively arranged fixedly in the one or more areas, and operable to receive the beacon signals to acquire the beacon identifiers and the beacon presence information and also to acquire the location information via the positioning system, and spontaneously or upon request to output the beacon identifiers, the beacon presence information, and the location information, and one or more fixed beacon terminals respectively arranged fixedly in the one or more areas, each of the fixed beacon terminals having a unique beacon identifier and being operable to broadcast a reference beacon signal, wherein:

the management server stores location information relating to arrangement of the one or more fixed management terminals and the one or more fixed beacon terminals;

the management server determines a state of presence of the objects under monitoring in the one or more areas, based on the beacon identifiers, the beacon presence information, and the location information as acquired from both of the one or more management terminals and the one or more fixed management terminals; and when the one or more management terminals or the one or more fixed management terminals receive not only the beacon signals but also the reference beacon signal, the management server determines that the one or more beacon terminals, which have broadcast the beacon signals, are located in the same area as the fixed beacon terminal that has broadcast the reference beacon signal.

11. The management system for objects under monitoring according to claim 1, wherein;
the one or more areas are one or more work areas;
the objects under monitoring are a plurality of field laborers working in the one or more work areas; and
the one or more moving bodies are the one or more site foremen who supervise the field laborers.

12. The management system for objects under monitoring according to claim 1, wherein:
the beacon terminals randomly select one signal pattern from the predetermined signal patterns using one or more numerals, one or more letters, and/or one or more symbols that are included in an individual number allocated to each of the beacon terminals.

13. The management system for objects under monitoring according to claim 1, wherein;
the beacon terminals randomly vary the ratio of the two or more signal pause periods using one or more numerals, one or more letters, and/or one or more symbols that are included in an individual number allocated to each of the beacon terminals.

14. A method of identifying beacon terminals for use in a management system for objects under monitoring, the management system comprising:
a plurality of beacon terminals respectively held by a plurality of objects under monitoring that are located and moving in one or more areas, each of the beacon terminals having a unique beacon identifier and being operable to broadcast a beacon signal, one or more management terminals respectively held by one or more moving bodies moving in the one or more areas and operable to receive the beacon signals to acquire the beacon identifiers and beacon presence information and also to acquire location information via a positioning system, and spontaneously or upon request to output the beacon identifiers, the beacon presence information, and the location information, and a management server operable to determine a state of presence of the objects under monitoring in the one or more areas, based on the beacon identifiers, the beacon presence information, and the location information as acquired from the one or more management terminals;

wherein the one or more moving bodies are one or more site foremen who supervise the plurality of objects under monitoring; and the method is for controlling the plurality of beacon terminals located in a neighborhood of the one or more management terminals in the management system for objects under monitoring, the method comprising:

preparing the beacon terminals that store a plurality of predetermined signal patterns and are operable to generate a signal array in a constant cycle according to one signal pattern selected from the predetermined signal patterns, the signal array including two or more beacon signals each having a constant time length and two or more signal pause periods;

selecting, at the beacon terminals in each cycle or in every some cycles, one signal pattern from the predetermined signal patterns for use in a subsequent cycle or some subsequent cycles;

generating another signal array according to the signal pattern, which has been newly selected, in the subsequent cycle or some subsequent cycles; and causing the plurality of beacon terminals to randomly vary a ratio of the two or more signal pause periods when the beacon terminals select the signal pattern in which the beacon signal and the signal pause period alternately appear.

15. The method of identifying beacon terminals according to claim 14, wherein:
the beacon terminals randomly select one signal pattern from the predetermined signal patterns using one or more numerals, one or more letters, and/or one or more symbols that are included in an individual number allocated to each of the beacon terminals.

16. The method of identifying beacon terminals according to claim 14, wherein:
the beacon terminals randomly vary the ratio of the two or more signal pause periods using one or more numerals, one or more letters, and/or one or more symbols that are included in an individual number allocated to each of the beacon terminals.

* * * * *